United States Patent [19]

Tate

[11] Patent Number: 5,111,589
[45] Date of Patent: May 12, 1992

[54] ADJUSTABLE PLUMB/LEVEL

[76] Inventor: Edwin M. Tate, 3801 South Quail La., Chattanooga, Tenn. 37415

[21] Appl. No.: 765,831

[22] Filed: Sep. 26, 1991

[51] Int. Cl.⁵ .............................................. G01C 9/28
[52] U.S. Cl. ................................................ 33/385
[58] Field of Search ............... 33/385, 384, 386, 387, 33/388, 379

[56] References Cited

U.S. PATENT DOCUMENTS

| | | |
|---|---|---|
| 288,624 | 11/1883 | Davis . |
| 516,024 | 3/1894 | Schaeffer .......................... 33/385 |
| 908,406 | 12/1908 | Henderson . |
| 1,380,611 | 6/1921 | Walker . |
| 1,703,006 | 7/1926 | Jay . |
| 1,765,060 | 6/1930 | DeAngelis . |
| 1,815,949 | 7/1931 | Marischal . |
| 2,102,364 | 12/1937 | Langsner . |
| 4,335,524 | 6/1982 | Schimming ...................... 33/379 X |
| 4,876,798 | 10/1989 | Zimmerman ..................... 33/379 X |
| 4,979,310 | 12/1990 | Wright ................................. 33/379 |

FOREIGN PATENT DOCUMENTS 771735 4/1957 United Kingdom .................. 33/388

Primary Examiner—Harry N. Haroian
Attorney, Agent, or Firm—Cushman, Darby, Cushman

[57] ABSTRACT

An adjustable plumb level formed from an I beam with wood side panels. A circular hole is formed through the I beam and side panels, within which an indicating mechanism is disposed. The indicating mechanism is easily replaceable so that the present invention can be used as a plumb or a level.

14 Claims, 2 Drawing Sheets

ADJUSTABLE PLUMB/LEVEL

BACKGROUND OF THE INVENTION

1. Field of the Invention

The present invention relates to levels for use in masonry, carpentry or in many other fields, such as architecture and interior design. More particularly, the present invention is directed toward an adjustable plumb level having a rotational, replaceable leveling mechanism.

2. Description of the Related Art

Adjustable levels have been known for a considerable time, but these levels lacked the necessary versatility to be used for long periods of time as either a plumb or a level. This required that the person using both levels and plumbs have more than just a single piece of equipment, and replace this equipment at fairly regular intervals.

For example, Jay in U.S. Pat. No. 1,703,006 suggested a spirit level that included a vial, which could be slightly tipped by an adjustment mechanism that would allow the bubble in all levels to become centered. However, Jay suggests that a curved vial be used, which is not useful when the level is turned 90°. Even though the vial may be tilted slightly to level the vial, there is not enough clearance within the gap where the vial is positioned to allow the vial to tip more than a few degrees. Further, the device disclosed by Jay includes a large number of parts to make the level operable. This is disadvantageous, especially if any of the parts should fail and need replacement.

Walker, in U.S. Pat. No. 1,380,611 also discloses a level. Walker mounts a vial with an enlarged center tightly within the beam making up the level. Thus, only minor adjustments are possible to the vial. Further, the device disclosed by Walker is only meant for use in a horizontal manner, and not in a vertical manner. It is possible that Walker intended the vial to be located in either a horizontal or a vertical position, but not in both positions using the same level.

Thus, the prior art is not capable of reversing itself and being used in a horizontal or a vertical position. Further, the prior art that is adjustable over the largest range requires use of many parts.

Due to the inherent inaccuracies of levels and plumbs, it is not uncommon for buildings to be built slightly askew. Minor errors in construction will force the next person that builds an adjacent or above structure to build the adjacent structure also at a slight tip to compensate for the skew in the first building or part. Thus, it is desirable to have an adjustable level that can be calibrated for perfect level or plumb and can be used in either a vertical or a horizontal position, i.e. as either a plumb or a level, without requiring the use of a great number of parts.

SUMMARY OF THE INVENTION

The present invention provides an adjustable plumb level with the number of moving parts minimized. The plumb level according to the present invention includes means for adjusting the level and means for allowing rapid replacement of the vial with another vial situated differently so that a single piece of equipment may be used as either a plumb or a level and allowing the present invention to be used in either a horizontal or a vertical position.

Further, the present invention includes only a single part that requires adjustment to tip the insert containing the vial. Adjustment of a single screw allows the vial to be gradually rotated so that the bubble within the vial may be centered. Also, use of a straight vial held in metal snap rings allows easy replacement and provides the ability to use the level in either a vertical or horizontal manner.

The present invention includes an I beam with wooden panels disposed on a first and second side thereof, wherein both the I beam and the panels have a circular aperture formed completely therethrough in which a replaceable indicating mechanism is disposed. The indicating mechanism includes a straight vial, a circular vial container with means for retaining the straight vial, vial protecting means for protecting the straight vial disposed towards the first and second side of the I beam, and means for retaining the vial container within said circular aperture.

The adjustable plumb level further includes means for adjusting the indicating mechanism where the adjusting means interacts with the vial container. A means for restraining the vial container is provided in the adjustable plumb level so that the adjusting means can only move the indicating mechanism over a limited range.

Other objects and features of the present invention will become apparent upon consideration of the following description and drawings. The methods of operation and the function of the related elements of structure will also become clear.

BRIEF DESCRIPTION OF THE DRAWING

The above-described objects of the present invention can be better appreciated by studying the following detailed description of the presently preferred embodiment together with the drawings in which.

DETAILED DESCRIPTION OF THE PRESENTLY PREFERRED EXEMPLARY EMBODIMENT

Figure 1:
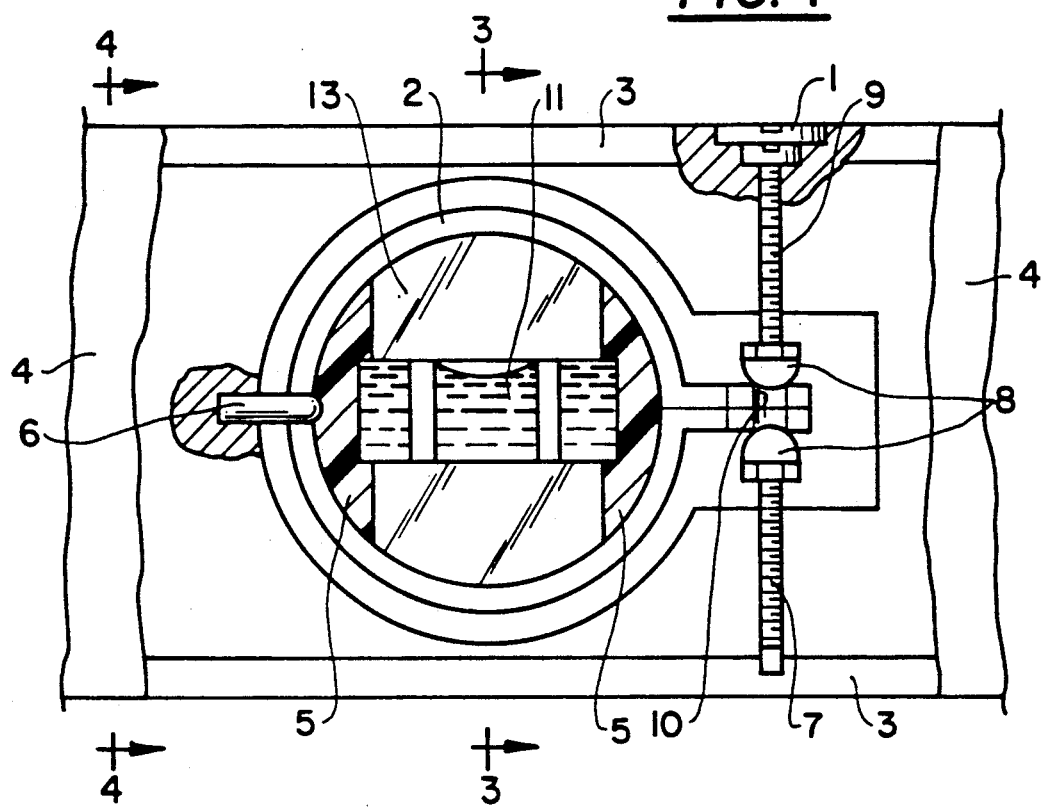
FIG. 1 is a plan view of the present invention, with side panels 4 partially cut away, depicting the present invention used as an adjustable level.
Figure 2:
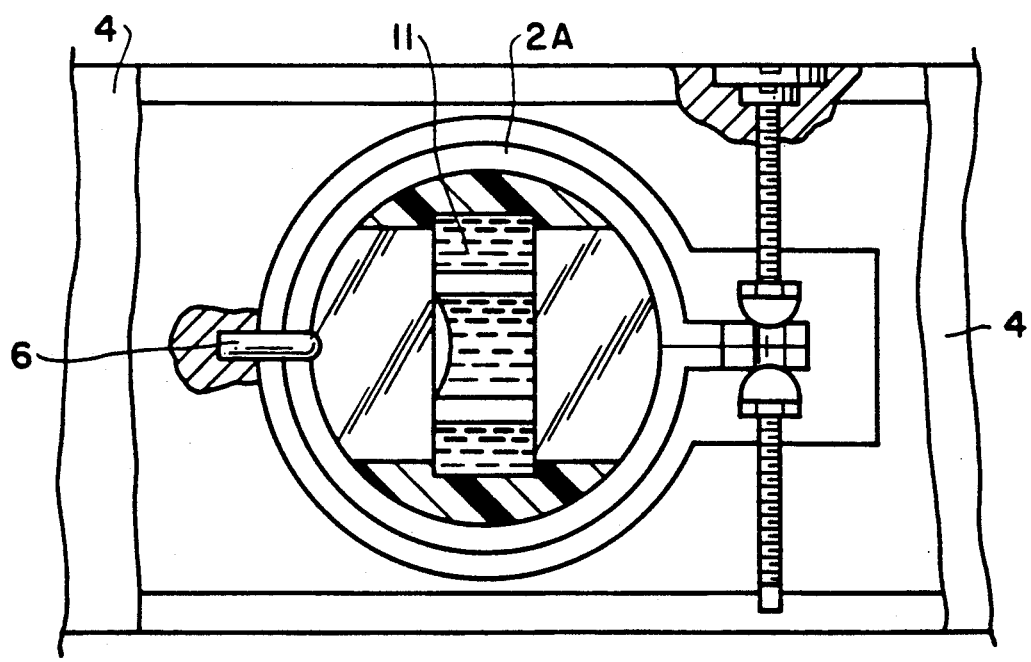
FIG. 2 is a plan view of the present invention, with side panels 4 partially cut away, depicting the present invention used as an adjustable plumb.
Figure 3:
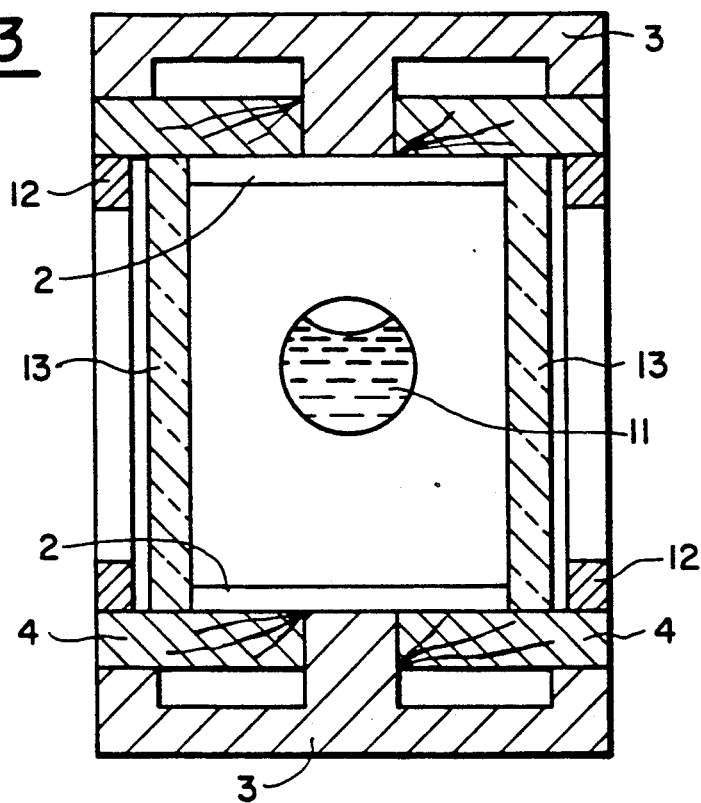
FIG. 3 is a cross sectional view taken along line III—III in FIG. 1.

The present invention is shown generally at 20 in FIG. 1 and FIG. 2. Adjustable plumb level 20 is constructed from aluminum I beam 3. Of course, many other materials may be used, but as aluminum is lighter in weight than most metals, it is preferable. Straight vial 11 is used in either a horizontal position (FIG. 1) or a vertical position (FIG. 2). That is, the device of FIG. 1 is preferably used as an adjustable level, while the device of FIG. 2 is preferably used as an adjustable plumb. In both configurations, vial 11 is held by, for example, resin vial holders 5 which is part of vial container 2. Resin vial holders 5 may be formed of many suitable materials, such as epoxy, as long as vial holder 5 can maintain vial 11 in a stationary position.

Vial container 2 may be removed and replaced by a different vial container having vial 11 situated at a different position. That is, vial container 2 holding the vial stationary in a horizontal position may be replaced by vial container 2A that holds vial 11 in a vertical or upright position.

Vial container 2 and 2A have view glasses 13 disposed on either side of vial container 2 and 2A. This ensures that vial 11 is protected from harm. View glasses 13 are not necessarily made of glass, but may be made out of any transparent material that will both allow observation of vial 11 and protect vial 11 from damage. Many of today's high technology plastics, such as "LEXAN" developed by General Electric, are suitable for use as view glass 13. In fact, many of the high tech plastics might be preferable as they will allow weight reduction of the entire adjustable plumb level 20 and additional protection against breakage.

Figure 4:
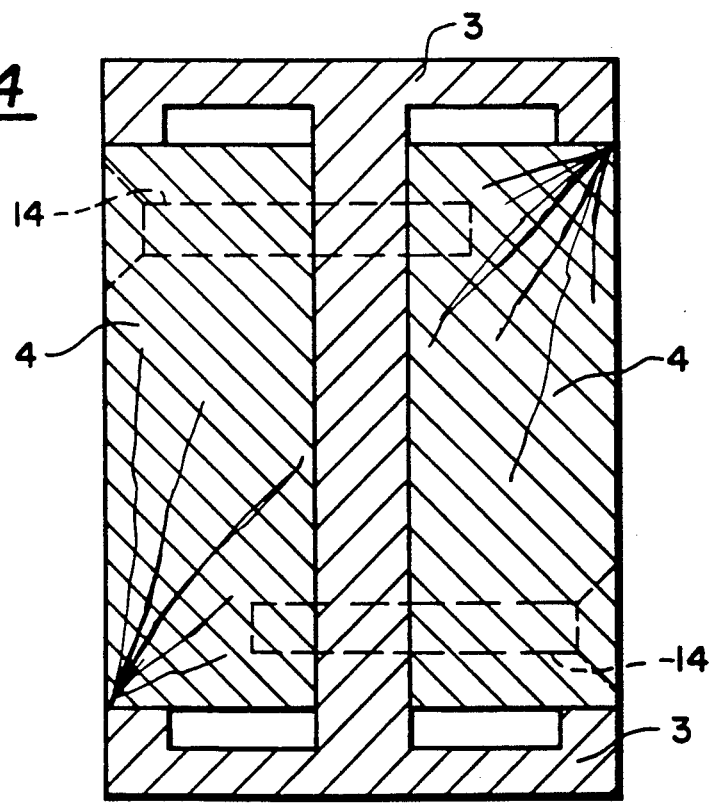
FIG. 4 is a cross sectional view taken along line IV—IV in FIG. 1.

I beam 3 has side panels 4 made of mahogany or any other suitable material. Besides making adjustable plumb level 20 more aesthetically pleasing, side panels 4 serve to make device 20 of a uniform thickness as is depicted in FIG. 4. Side panels 4 are held to I beam 3 by means of self-tapping sheet metal screws 14. Other possible means of attachment are possible, such as use of glues. Further, side panels 4 can be formed of other materials, but the look and strength of wood are advantages thereof.

Circular vial container 2 or 2A is positioned in a circular opening formed completely through both I beam 3 and side panels 4. View glasses 13 fit outside the vial container 2, 2A and inside the circular opening. Metal snap rings 12 are disposed within the circular opening but outside the view glasses on either side of the circular opening. Snap rings 12 may be removed to remove the view glasses 13 and vial container 2, 2A.

FIGS. 1 and 2 depict a ⅛ inch pivot pin mounted within I beam 3. Pivot pin 6 may also be a different length than ⅛ inch. Pin 6 is positioned at the halfway point between the top and bottom of I beam 3. Pivot pin 6 may be integral with vial container 2 or simply fit in loosely. A loose fit allows vial container 2 to rotate slightly when pressure is applied in a rotational direction. Such movement makes the present invention adjustable.

Rotational pressure is applied by ⅛ inch adjusting screw 9. Adjustment of screw 9 in either a clockwise or counterclockwise direction allows for the screw to apply increased pressure or decreased pressure to radiused lock nut 8. Lock nut 8 sits in slotted hole 10 formed in an extension of vial container 2. Application of pressure to vial container 2 causes slight rotational movement that will adjust the plumb or level. A balancing force counter to the force from screw 9 is provided by threaded receiver 7. Receiver 7 is also provided with a lock nut 8 that contacts the slotted hole 10. For aesthetic reasons, a screw cap 1 is disposed over the head of adjusting screw 9.

The present invention has been described in connection with what is presently considered to be the most practical and preferred embodiment, but it is to be understood that the invention is not limited to the disclosed embodiment, but is intended to cover various arrangements and assorted modifications included within the spirit and scope of the appended claims.

What is claimed is:

1. An adjustable plumb level, comprising:
    an I-shaped structure beam having first and second opposite, flat sides;
    means disposed on said first side and said second side for protecting said adjustable plumb level;
    wherein said I beam shaped structure and said protecting means include a circular aperture formed completely therethrough from a first surface to a second surface;
    a replaceable indicating mechanism disposed in said circular aperture, said indicating mechanism including:
        a straight levelling-type vial having a levelling bubble and levelling marks between which said levelling bubble sits to indicate proper level or plumb;
        a circular vial container including means for retaining said straight vial therein, and outer surfaces defining a circular shape;
        vial protecting means for protecting said straight vial, disposed between said outer surfaces of said circular vial container and said first and second side of said I beam-shaped structure; and
        means for retaining said vial container within said circular aperture while allowing rotation of said outer surfaces relative to said circular aperture;
    means for adjusting a rotational position of said indicating mechanism relative to said first and second sides, said adjusting means interacting with said vial container; and
    means for restraining said vial container so that said adjusting means can only move said indicating mechanism over a limited range.

2. An adjustable plumb level as claimed in claim 1, wherein said protecting means are side panels disposed on said first and second sides of said I beam-shaped structure.

3. An adjustable plumb level as claimed in claim 2, wherein said side panels are made of mahogany.

4. An adjustable plumb level as claimed in claim 1, wherein said means for retaining said straight vial includes a resin material disposed on an inner circumferential side of said circular vial container.

5. An adjustable plumb level as claimed in claim 4, wherein said resin material is epoxy.

6. An adjustable plumb level as claimed in claim 1, wherein said vial protecting means are transparent plates disposed towards said first and second sides of said I beam.

7. An adjustable plumb level as claimed in claim 6, wherein said transparent plates are made of glass.

8. An adjustable plumb level as claimed in claim 6, wherein said transparent plates are made of plastic.

9. An adjustable plumb level as claimed in claim 1, wherein said vial container retaining means are metal snap rings that are disposed within said circular aperture on an outside surface of said vial protecting means.

10. An adjustable plumb level as claimed in claim 1, wherein said adjusting means includes an adjustment screw and a threaded receiver.

11. An adjustable plumb level as claimed in claim 1, wherein said restraining means includes:
    a notch formed in said vial container; and
    a pivot pin having a curved end disposed within said notch, said pivot pin being held by said I beam.

12. An adjustable plumb level as claimed in claim 1, wherein said vial is disposed within said vial container so that said vial is perpendicular to a longitudinal axis of said I beam.

13. An adjustable plumb level as claimed in claim 1, wherein said vial is disposed within said vial container so that said vial is parallel to a longitudinal axis of said I beam.

14. An adjustable plumb level, comprising:

a supporting structure having a first side and a second side;

first means, attached to said first side, for protecting said first side;

second means, attached to said second side, for protecting said second side;

wherein said supporting structure and said first and second protecting means have a substantially circular aperture formed therethrough;

a replaceable vial container, disposed within said circular aperture, having an inner and outer circumferential wall with a notch formed from said outer to said inner circumferential notch;

a vial holder disposed on said inner circumferential wall of said container;

a straight vial held by said holder;

adjustment screws interacting with said vial container to apply rotational pressure to said vial container; and a restraining pin disposed within said I beam and having a curved tip disposed within said notch, said pin restraining an amount of allowable rotational movement of said vial container.

* * * * *